United States Patent

Kitagawa

[11] Patent Number: 5,835,798
[45] Date of Patent: Nov. 10, 1998

[54] CAMERA HAVING MOTION COMPENSATION DEVICE WHICH CONTROLS A CENTERING OPERATION OF A VIBRATION REDUCTION LENS

[75] Inventor: Yoshihisa Kitagawa, Kasukabe, Japan

[73] Assignee: Nikon Corporation, Tokyo, Japan

[21] Appl. No.: 782,311

[22] Filed: Jan. 15, 1997

Related U.S. Application Data

[63] Continuation of Ser. No. 652,343, May 23, 1996, abandoned.

[30] Foreign Application Priority Data

May 23, 1995 [JP] Japan ................................. 7-123544
May 23, 1995 [JP] Japan ................................. 7-123805

[51] Int. Cl.$^6$ ................................................ G03B 7/00
[52] U.S. Cl. ............................................. 396/55; 396/52
[58] Field of Search .............................. 396/52, 55, 137; 348/208

[56] References Cited

U.S. PATENT DOCUMENTS 5,101,230  3/1992  Shikaumi et al. ................ 354/430
5,231,445  7/1993  Onuki et al. ....................... 354/410

Primary Examiner—Daniel P. Malley

[57] ABSTRACT

A camera having a lens which is shiftable to suppress image blur, and which controls a centering operation of the lens. The camera is settable to be in a serial photo mode for taking a series of continuous photographs, and in a non-serial photo mode for taking individual photographs. The lens has an initial position, typically a centered position. The camera includes a control mechanism for controlling the lens. When the camera is set in the non-serial photo mode, the control mechanism suppresses image blur by, for each individual photograph to be taken, positioning the lens at the initial position before the photograph is taken and shifting the lens from the initial position. When the camera is set in the serial photo mode, the control mechanism suppresses image blur by, for photographs taken subsequent to a first photograph of a series of continuous photographs, shifting the lens from the final lens position of the previous photograph, without repositioning the lens at the initial position.

26 Claims, 7 Drawing Sheets

CAMERA HAVING MOTION COMPENSATION DEVICE WHICH CONTROLS A CENTERING OPERATION OF A VIBRATION REDUCTION LENS

This application is a continuation of application Ser. No. 08/652,343, filed May 23, 1996, now abandoned.

BACKGROUND OF THE INVENTION

1. Field of the Invention

The present invention relates to a camera having a motion compensation device which shifts a vibration reduction lens (hereinafter also referred to as a "VR lens") to reduce or suppress image blur of a resulting photograph, and, more particularly, to a camera having a motion compensation device which controls a centering operation of the VR lens during serial photography.

2. Description of the Related Art

Optical systems project an image onto an image plane. Conventional image blur suppression devices suppress, or reduce, blurring of the image. A motion compensation device is a type of image blur suppression device, and compensates for motion incident upon the optical system. Motion is typically imparted to the optical system by vibrations in the optical system, or in a surrounding holding member.

Conventional cameras use a motion compensation device to suppress image blur resulting from motion of the camera. Such motion is typically caused by hand tremors of the photographer. In general, a conventional motion compensation device in a camera cause a compensation lens (typically referred to as a "vibration reduction lens" or "VR lens") to shift in a direction orthogonal to the optical axis of the camera. This shifting of the VR lens causes a shift, relative to the optical system, of the image projected by the optical system. The VR lens is typically a lens or lens system which is a part of an overall photographic lens system of the camera. The VR lens has a limited range of movement.

Moreover, many cameras have a serial photo mode in which a plurality of continuous photographs can be taken in series. Typically, the plurality of continuous photographs are taken in series while the photographer fully-pushes the camera shutter release button (hereinafter "release button"). In other words, the photographer holds down the release button to initiate the series of continuous photographs when the camera is in serial photo mode. The camera stops taking photographs when the photographer releases the release button.

During serial photo mode, it is possible that the VR lens will be at the outer limit of its range of movement after a respective photograph is taken and before the subsequent photograph is taken. As a result, the VR lens will not be able to adequately compensate for image blur during the subsequent photograph. For example, in special photographic circumstances, a professional or highly skilled amateur photographer may take ten (10) or more continuous photographs during serial photo mode. In this case, it is likely that the VR lens will reach the outer limit of its range of movement during the sequence of photographs. As a result, adequate suppression or reduction of image blur cannot be performed for all the photographs taken during serial photography.

To provide sufficient suppression or reduction of image blur during serial photo mode, the VR lens is typically "centered" after each photograph. For example, after a respective photograph is taken and before a subsequent photograph is taken, the VR lens is typically moved to an optimal starting position within its range of movement. The optimal starting position is a predetermined, initial position relative to the optical axis of the photographic lens, such that the largest drive range of the VR lens can be obtained for the second photograph. This movement of the VR lens to the optimal starting position is typically referred to as "centering" the VR lens. When the VR lens is driven to suppress image blur, the VR lens is moved from this initial position and within its range of movement.

Conventionally, centering is performed after each photograph taken during serial photo mode, and before motion compensation can begin for the subsequent photograph. Such frequent centering can cause an undesirable delay between photographs taken during serial photo mode, and increase the power consumption of the camera.

Moreover, during serial photo mode, a photographer typically takes a series of continuous photographs of the same subject. As a result, the camera is generally maintained in a steady position, thereby incurring less vibration for each subsequent photograph, as compared to a case where the photographer takes individual, noncontinuous photographs. Therefore, a conventional camera often performs unnecessary centering of the VR lens during serial photography, since it may not be required to center to VR lens to perform sufficient motion compensation for each photograph.

In addition, during serial photography, a photographer often takes a small number of photographs. For example, a photographer may take ten (10) or less continuous photographs during serial photography. Therefore, if no centering is performed between the serial photographs, the final position of the VR lens would typically be relatively close to the optical axis. In other words, the VR lens would only move a small distance during the first photograph to the last photograph. As a result, a conventional camera may perform unnecessary centering operations when a relatively small number of photographs are taken during serial photography, thereby undesireably increasing photographic preparatory time between photographs.

Further, during serial photography, cameras perform many different photographic preparatory operations between sequential photographs. For example, the film must be wound to the next frame and the shutter may need to be charged. Such preparatory operations undesireably decrease the film frame speed of the camera since they slow down the number of photographs which can be taken over a fixed period of time. Moreover, centering is an additional preparatory operation which undesireably decreases the film frame speed of the camera. Therefore, unnecessary centering performed by conventional cameras will unnecessarily decrease the film frame speed of the camera and cause the photographer to lose photographic opportunities.

SUMMARY OF THE INVENTION

Accordingly, it is an object of the present invention to provide a camera having a motion compensation device which shifts a VR lens to suppress image blur, wherein, during serial photo mode, the motion compensation device performs accurate motion compensation, minimizes power requirements, and maintains a relatively high film frame speed by eliminating unnecessary centering of the VR lens.

Objects of the present invention are achieved by provide a camera which is settable to be in a serial photo mode for taking a series of continuous photographs, and in a non-serial photo mode for taking individual photographs. The camera includes a lens which is shiftable during each photograph to suppress image blur, and a control mechanism for controlling the lens. The lens has an initial position, typically a centered position. Moreover, the position of the lens after a respective photograph is taken is defined as the final lens position for the respective photograph. When the camera is set in the non-serial photo mode, the control mechanism suppresses image blur by, for each individual photograph to be taken, positioning the lens at an initial position before the photograph is taken and shifting the lens from the initial position. When the camera is set in the serial photo mode, the control mechanism suppresses image blur by, for photographs taken subsequent to the first photograph of a series of continuous photographs, shifting the lens from the final lens position of the previous photograph, without repositioning the lens at the initial position.

Objects of the present invention are also achieved by providing a lens which is shiftable to compensate for image blur, and a control mechanism, where control of the lens is based on the drive time of the lens. More specifically, for each photograph taken, a lens drive time is defined as the time during which the lens is shifted to suppress image blur for the photograph. When the camera is set in the non-serial photo mode, the control mechanism suppresses image blur by, for each individual photograph to be taken, positioning the lens at an initial position before the photograph is taken and shifting the lens from the initial position. When the camera is set in the serial photo mode, the control mechanism suppresses image blur by, for photographs taken subsequent to the first photograph of a series of continuous photographs, (a) shifting the lens from the final lens position of the previous photograph, without repositioning the lens at the initial position, when the total of the drive times for previous photographs taken since the lens was last positioned at the initial position is less than a maximum time, and (b) positioning the lens at the initial position before a respective photograph is taken and shifting the lens from the initial position, when the total of the drive times for previous photographs taken since the lens was last positioned at the initial position is greater than or equal to the maximum time.

Further, objects of the present invention are achieved by providing the camera with a control mechanism which (a) when the camera is set in the non-serial photo mode, suppresses image blur by, for each individual photograph to be taken, positioning the lens at the initial position before the photograph is taken and shifting the lens from the initial position, and, (b) when the camera is set in the serial photo mode, suppresses image blur by, for photographs taken subsequent to the first photograph of a series of continuous photographs, (i) shifting the lens from the final lens position of the previous photograph, without repositioning the lens at the initial position, when the film frame speed of the camera is less than a threshold value, and (ii) positioning the lens at the initial position before a respective photograph is taken and shifting the lens from the initial position, when the film frame speed of the camera is greater than or equal to the threshold value.

Additional objects and advantages of the invention will be set forth in part in the description which follows, and, in part, will be obvious from the description, or may be learned by practice of the invention.

DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
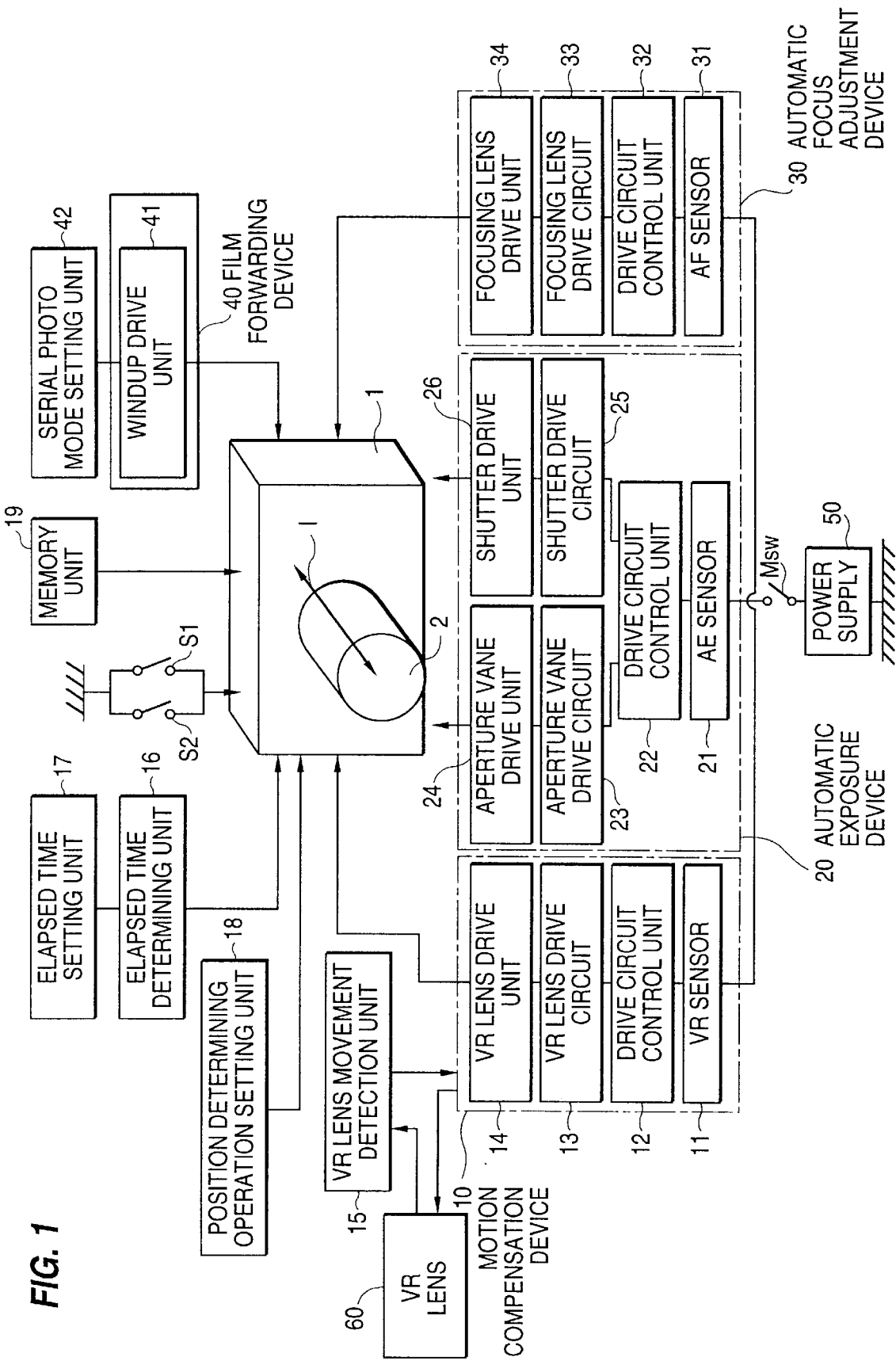
FIG. 1 is a block diagram illustrating a camera having a motion compensation device, according to an embodiment of the present invention.

Reference will now be made in detail to the present preferred embodiments of the present invention, examples of which are illustrated in the accompanying drawings, wherein like reference numerals refer to like elements throughout.

FIG. 1 is a block diagram illustrating a camera having a motion compensation device, according to an embodiment of the present invention. Referring now to FIG. 1, the camera includes a camera body 1 and a lens 2 attached thereto. A release button (not illustrated) has a half-push position and a full-push position. When the release button is pushed to the half-push position, a switch SW1 turns ON to thereby cause the camera to perform preparatory operations such as adjustment of the shutter speed and focal length. When the release button is pushed to the full-push position, a switch SW2 turns ON to thereby cause the camera to perform a conventional exposure operation. During the exposure operation, a shutter (not illustrated) is released to take a photograph.

The camera has a serial photo mode in which a series of continuous photographs can be taken. A serial mode setting unit 42 is for setting the camera to be in serial photo mode. When serial mode setting unit 42 sets the camera to be in serial photo mode, the continuous pushing of the release button to the full-push position causes the camera to continue taking photographs one after the other, to take a series of continuous photographs, until the release button is released. Serial photo mode is referred to as a film forwarding mode of the camera. When the camera is not set in serial photo mode, the camera can be considered to be set in a "non-serial photo mode". When in a "non-serial photo mode", the camera takes non-continuous, individual photographs. For example, when in a "non-serial photo mode", the camera only takes one photograph when the release button is pushed to the full-push position. Typically, when in a "non-serial photo mode", a subsequent photograph is not taken until the release button is released from the full-push position and pushed again to the full-push position.

Lens 2 includes a plurality of lenses (not illustrated) which together form a photographic optical system of the camera. An optical axis I of the camera extends through lens 2. Lens 2 also includes a VR lens 60 which is shiftable in a direction orthogonal to the optical axis I, to thereby suppress image blur resulting from motion or vibration affecting the camera. Although not clearly drawing in FIG. 1, VR lens 60 is positioned inside lens 2.

A motion compensation device 10 is for shifting VR lens 60 in the direction orthogonal to the optical axis I. Motion compensation device 10 includes a VR sensor 11, a drive circuit control unit 12, a VR lens drive circuit 13 and a VR lens drive unit 14. VR sensor 11 detects the attitude (for example, the position, speed, acceleration, angle, angular velocity and/or angular acceleration) of the camera, and produces a corresponding output signal. Drive circuit control unit 12 receives the output signal of VR sensor 11 and, based on the received output signal, calculates a drive amount and drive speed of VR lens 60. Based on the calculated drive amount and drive speed, drive circuit control unit 12 shifts VR lens 60 by driving VR lens drive unit 14 via VR lens drive circuit 13.

A VR lens movement detection unit 15 uses encoders (not illustrated) to detect the movement amount of VR lens 60, and provides the detected movement amount to motion compensation device 10. For example, before the first photograph is taken during serial photo mode, VR lens 60 is preferably centered at an initial position where the optical axis of VR lens 60 coincides with the optical axis I of the camera. VR lens movement detection unit 15 detects the movement amount of VR lens 60 from the initial position. In this manner, motion compensation device 10 can control the movement of VR lens 60 so that VR lens 60 moves by the calculated drive amount and drive speed.

An elapsed time setting unit 17 allows a photographer to set an elapsed time for determining when VR lens 60 is to be centered. For example, an elapsed time can be set by the photographer so that VR lens 60 is only centered for a subsequent photograph if the drive time for driving VR lens 60 in the previous photograph is longer than the elapsed time set by the photographer. An elapsed time determination unit 16 determines, for a respective frame of film, whether or not the elapsed time has exceeded the elapsed time set by the photographer.

A position determining operation setting unit 18 is settable by the photographer to determine whether or not centering of VR lens 60 is to be performed. For example, position determining operation setting unit 18 can be set ON or OFF. When position determining operation setting unit 18 is ON, centering of VR lens 60 is performed. When position determining operation setting unit 18 is OFF, centering of VR lens 60 is not performed.

The camera can be set to various performance levels. For example, the camera can be set for use by highly skilled photographers (such as professional and highly skilled amateur photographers), or for use by lower skilled photographers (such as general amateur or novice photographers). When the camera is set for use by highly skilled photographers, the camera generally includes or performs conventional photographic functions which are used by highly skilled photographers. When the camera is set for use by lower skilled photographers, the camera generally includes or performs conventional photographic functions which are used by lower skilled photographers. The camera can be set at the time of manufacture to be for use by highly skilled photographers, or for use by lower skilled photographers. Alternatively, the camera can have a switch (not illustrated) which is switchable to enable functions typically used by highly skilled photographers (thereby setting the camera for use by highly skilled photographers) or to enable functions typically used by lower skilled photographers (thereby setting the camera for use by lower skilled photographers). A memory unit 19 stores data to indicate whether the camera is set for use by highly skilled photographers or whether the camera is set for use by lower skilled photographers.

An automatic exposure device 20 is for detecting the luminosity of the subject field and driving a shutter (not illustrated) in accordance with the detected luminosity. Automatic exposure device 20 includes an automatic exposure (AE) sensor 21, a drive circuit control unit 22, an aperture vane drive circuit 23, an aperture vane drive unit 24, a shutter drive circuit 25 and a shutter drive unit 26. AE sensor 21 detects the luminosity of the subject field, and produces a corresponding output signal. Drive circuit control unit 22 receives the output signal from AE sensor 21 and then calculates appropriate exposure conditions.

For example, drive circuit control unit 22 calculates a shutter open time of a shutter (not illustrated) and an aperture size of a variable aperture (not illustrated) formed by aperture vanes (not illustrated). Then, automatic exposure device 20 drives shutter drive unit 26 via shutter drive circuit 25, to drive the shutter and provide the calculates shutter open time. Also, automatic exposure device 20 drives aperture vane drive unit 24 via aperture vane drive circuit 23, to thereby control the aperture vanes forming the variable aperture. In this manner, automatic exposure device 20 sets the size of the variable aperture.

An automatic focus adjustment device 30 detects the distance to the subject and performs a corresponding focusing operation. Automatic focus adjustment device includes an autofocus (AF) sensor 31, a drive control unit 32, a focusing lens drive circuit 33 and a focusing lens drive unit 34. AF sensor 31 detects the distance to the subject, and produces a corresponding output signal. Drive circuit control unit 32 receives the output signal of AF sensor 31, and determines drive parameters for driving a focusing lens (not illustrated) in the optical axis direction. Although not illustrated, the focusing lens is inside lens 2 and is part of the photographic optical system. Automatic focus adjustment device 30 drives focus lens drive unit 34 via focus lens drive circuit 33, to perform focus in accordance with the drive parameters determined by the drive circuit control unit 32.

A film forwarding device 40 includes a windup drive unit 41 for winding the film after the completion of each exposure. A power supply 50 supplies power to the camera. A main switch Msw is a microswitch for connecting and disconnecting the supply of power from power supply 50 to the camera.

Motion compensation device 10, automatic exposure device 20, automatic focus adjustment device 30, power supply 30, positioning determining operation setting unit 18, elapsed time determining unit 16, elapsed time setting unit 17, memory unit 19, serial photo mode setting unit 42 and windup drive unit 41 are all preferably located inside camera body 1. However, many of these elements, or portions thereof, can be located inside lens 2. In addition, VR lens 60 and VR lens movement detection unit 15 are preferably located in lens 2. However, it is possible that these elements, or portions thereof, can be located inside camera body 1.

Figure 2:
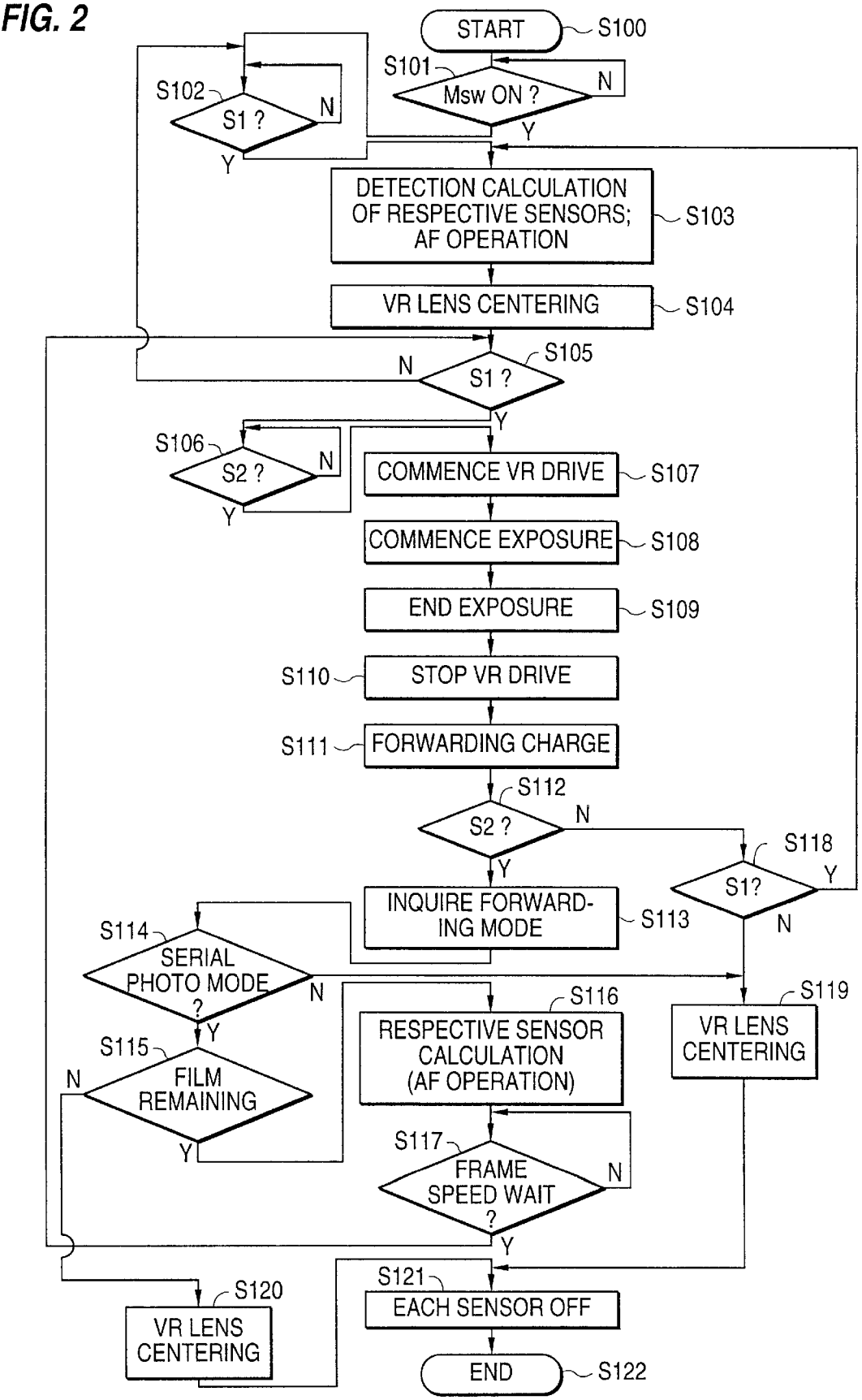
FIG. 2 is a flow chart illustrating a processing sequence of a camera as illustrated in FIG. 1, according to an embodiment of the present invention.

FIG. 2 is a flow chart illustrating a processing sequence of a camera as illustrated in FIG. 1, according to an embodiment of the present invention. More specifically, FIG. 2 illustrates a processing sequence where VR lens 60 is centered before the first photograph taken during serial photo mode, but is not centered after each subsequent photograph taken during serial photo mode. As a result, the film frame speed is relatively high during serial photo mode, since the additional delay caused by centering VR lens 60 is not incurred between photographs. The processing sequence in FIG. 2 is performed by a CPU (preferably a single CPU) which functions as drive circuit control unit 12, drive circuit control unit 22 and drive circuit control unit 32.

Referring now to FIG. 2, the process starts in step S100. From step S100, the process moves to step S101 where that status of main switch MSW is checked. If main switch MSW if OFF in step S101, the process waits at step S101 until main switch MSW is turned ON. If main switch MSW is ON in step S101, the process moves to step S102. In step S102, the process waits until switch SW1 turns ON, thereby indicating that the release button is pushed to the half-push position. When switch SW1 is ON in step S102, the process moves to step S103, where power is supplied to VR sensor 11, AE sensor 21, AF sensor 31 and corresponding calculations are performed. More specifically, in step S103, drive circuit control unit 22 determines appropriate values for the shutter speed and aperture value, and drive circuit control unit 32 controls autofocus (AF) drive of focusing lens drive unit 34.

From step S103, the process moves to step S104, where drive circuit control unit 12 centers VR lens 60 to a predetermined initial position at which the optical axis of VR lens 60 coincides with, or is aligned with, the optical axis I of the camera.

From step S104, the process moves to step S105, where the status of switch SW1 is checked. When switch SW1 is OFF in step S105 (thereby indicating that the release button is not pushed to the half-push position), the process moves to step S102 and waits for SW1 to be switched ON again. That is, switch SW1 must have been switched ON for the process to have reached step S105; however, if switch SW1 is OFF at the time the process reaches step S105 (indicating that the release button is no longer pushed to the half-push position), the process moves to step S102 and waits for switch SW1 to be turned ON (that is, for the release button to be pushed to the half-push position). When switch SW1 is ON in step S105, the process moves to step S106 and were the status of switch SW2 is determined. When switch SW2 is OFF in step S106 (thereby indicating that the release button is not pushed to the full-push position), the process waits at step S106 for switch SW2 to be turned ON. When switch SW2 is ON in step S106 (thereby indicating that the release button is pushed to the full-push position), the process moves to step S107.

In step S107, drive circuit control unit 12 drives VR lens 60 based on the output of VR sensor 11. From step S107, the process moves to step S108, where drive circuit control unit 22 starts an exposure operation to exposure a recording medium (not illustrated), such as, for example, film or an optical disk. From step S108, the process moves to step S109, where the exposure operation is ended after a predetermined time period, corresponding to the exposure time, has elapsed. From step S109, the process moves to step S110, where drive circuit control unit 12 stops the drive of VR lens 60. Therefore, after step S110, VR lens 60 is maintained at its current position after exposure ended in step S109. From step S110, the process moves to step S111, where the film is forwarded one frame. Moreover, other process can be performed in step S111 to prepare for the next photograph. Such other processes can include, for example, charging the shutter and raising a mirror (in a single-lens-reflex camera).

From step S111, the process moves to step S112, where the status of switch SW2 is checked (to thereby check whether the release button is pushed to the full-push position). If switch SW2 is ON in step S112 (thereby indicating that the release button is still pushed to the full-push position), the process moves to step S113. If switch SW2 is OFF in step S112 (thereby indicating that the release button is no longer pushed to the full-push position), the process moves to step S118.

In step S118, the status of switch SW1 is checked. If switch SW1 is ON in step S118 (thereby indicating that the release button is pushed to the half-push position), the process moves to step S103. If switch SW1 of OFF in step S118 (thereby indicating that the release button is not pushed to the half-push position), the process moves to step S119, where VR lens 60 is centered. From step S119, the process moves to step S121, where the power supplied to VR sensor 11, AE sensor 21 and AF sensor 31 is stopped. From step S121, the process moves to step S122 and ends.

When switch SW2 is ON in step S112 (thereby indicating that the release button is pushed to the full-push position), the process moves to step S113, where an inquiry is made to determine the film forwarding mode. From step S113, the process moves to step S114, where it is determined whether the film forwarding mode is set as serial photo mode. When the film forwarding mode is not set as serial photo mode in step S114, the process moves to step S119, where VR lens 60 is centered. When the film forwarding mode is set as serial photo mode in step S114 (thereby indicating the a continuous sequence of photographs are to be taken), the process moves to step S115. In step S115, it is determined whether one or more film frames remain. If there are one or more film frames remaining in step S115, the process moves to step S116 where drive circuit control unit 22 calculates the shutter speed and aperture value for the next photograph. Also, AF drive is performed in step S116, if necessary. From step S116, the process moves to step S117, where the process waits until the film frame speed has elapsed. After the film frame speed elapses in step S117, the process returns to step S105 so that another photograph can be taken.

As can be seen from FIG. 2, centering is not performed between sequential photographs when serial photo mode is set. Therefore, during serial photo mode, VR lens 60 is only centered for the first photograph taken in the series of photographs. Then, during each subsequent photograph taken during serial photo mode, the drive of VR lens continues, without centering, from the final position of VR lens 60 during the previous photograph. As a result, the start each subsequent exposure is not delayed by a centering operation. Moreover, as illustrated in FIG. 2, VR lens 60 is centered after the final photograph in serial photo mode is taken. For example, VR lens 60 is centered in step S119 after the release button is released from the full-push position to end the series of sequential photographs.

As described above, the processing sequence of FIG. 2 allows motion compensation to be adequately performed during serial photo mode, without unnecessarily centering VR lens 60 after each photograph. For example, during serial photography, the number of photographs taken is typically less than ten (10). As a result, when serial photo ends, the position of VR lens 60 from the optical axis I of the camera, or from the initial centered position of VR lens 60, is relatively small. Therefore, VR lens 60 will generally not reach the outer limit of its range of movement. The processing sequence of FIG. 2 is ideal in such a situation.

Figure 3:
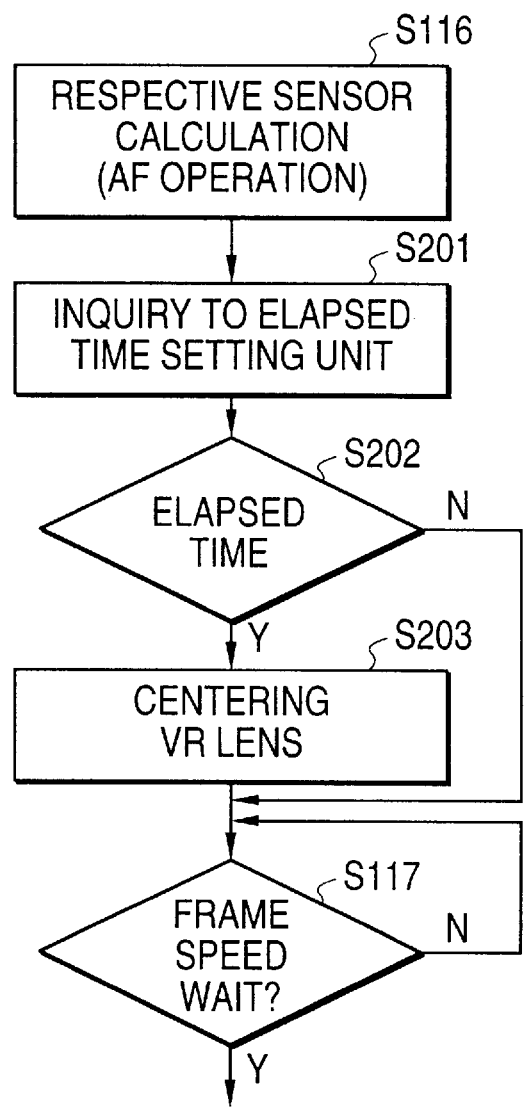
FIG. 3 is a flow chart illustrating a processing sequence of a camera as illustrated in FIG. 1, according to an additional embodiment of the present invention.

FIG. 3 is a flow chart illustrating a processing sequence of a camera as illustrated in FIG. 1, according to an additional embodiment of the present invention. FIG. 3 illustrates a modification of the processing sequence illustrated in FIG. 2, and illustrates additional steps to be performed between Steps S116 and S117 of FIG. 2. More specifically, FIG. 3, combined with FIG. 2, illustrates a processing sequence in which, during serial photo mode, VR lens 60 is only centered for a subsequent photograph if the drive time for driving VR lens 60 in the previous photograph is longer than the elapsed time set by the photographer. In this manner, the VR lens may not be automatically centered after each photograph.

Referring now to FIG. 3, from step S116 the process moves to step S201. However, before the process reaches step S201, VR lens 60 was initially centered in step S104 (see FIG. 2), an exposure operation was initiated in step S108 (see FIG. 2), the exposure operation was ended in step S109 (see FIG. 2), and the camera was in serial photo mode in step S114 (see FIG. 2). Then, in step S201, an inquiry is made to the elapsed time determining unit 15. At this time, the elapsed time determining unit 15 obtains, from elapsed time setting unit 17, the elapsed time set by the photographer. From step S201, the process moves to step S202, where it is determined whether or not the drive time for driving VR lens 60 in the last taken photograph is longer than the elapsed time set by the photographer. Therefore, it is determined whether the time to drive VR lens 60 from step S107 (see FIG. 2) to step S110 (see FIG. 2) for the last taken photograph is greater than or equal to the elapsed time set by the photographer.

In step S202, when the time to drive VR lens 60 for the last taken photograph is greater than or equal to the elapsed time set by the photographer, the process moves to step S203 where VR lens 60 is centered. From step S203, the process moves to step S117. In step S202, when the time to drive VR lens 60 for the last taken photograph is not less than or equal to the elapsed time set by the photographer, the process moves to step S117 so that step S203 is skipped and VR lens 60 is not centered.

Therefore, according to the embodiments of the invention as illustrated in FIG. 3, VR lens 60 is centered before the first photograph taken during serial photo mode. VR lens 60 is then only centered for a subsequent photograph if the drive time of VR lens 60 during the previous photograph is greater than or equal to the elapsed time set by the photographer.

As discussed above, the elapsed time corresponds to the drive time for driving VR lens 60 in the previous photograph. However, the elapsed time can easily correspond to other time measurements. For example, in an additional embodiment of the present invention, the elapsed time can correspond to the time from the previous centering operation. Therefore, step S202 in FIG. 3 would determine whether the elapsed time from the previous centering operation is greater than or equal to the elapsed time set by the photographer. VR lens 60 would then be centered only after the elapsed time set by the photographer has elapsed from the previous centering operation.

Alternatively, the elapsed time could correspond to the total amount of drive time of VR lens 60 since the previous centering operation. Therefore, VR lens 60 would only be centered after the total drive time is greater than or equal to the elapsed time set by the photographer. For example, for each photograph, the drive time of VR lens 60 equals the time elapsing from step S107 (see FIG. 2) to step S110 (see FIG. 2). This drive time would be totaled for each photograph taken since the last centering operation. VR lens 60 would only be centered if this total drive time is greater than or equal to the elapsed time set by the photographer.

The elapsed time is described as being set by the photographer via elapsed time setting unit 17. Alternatively, the elapsed time can be set at the time of manufacture, without being changeable by the photographer.

According to embodiments of the present invention as illustrated in FIG. 3, centering of VR lens 60 is performed after an elapsed time is greater than or equal to a predetermined amount of time. Therefore, after the predetermined time actually elapses, VR lens 60 is centered before motion compensation drive begins for the next photograph. As a result, VR lens 60 will not move to the outer limit of its range of movement, even when the number of photographs taken during serial photo mode is relatively large. Thus, motion compensation can be sufficiently performed during each photograph.

Different photographers have different levels of skill. Generally, photographers can be divided into two categories: highly skilled photographers and novice photographers. Highly skilled photographers include professional photographers and high-skilled amateur photographers. Novice photographers include all other photographers, including amateur photographers who are not high-skilled at photographer. The camera tends to experience a much greater amount of vibration when used by a novice photographer, as compared to the amount of vibration when used by a highly skilled photographer. For example, a novice photographer tends to produce much more hand tremor vibration than a highly skilled photographer.

Moreover, highly skilled photographers tend to take many more photographs in serial photo mode, as compared to novice photographers. For example, highly skilled photographers often taken ten (10) or more sequential photographers during serial photo mode. Novice photographers generally take a much smaller number of photographers in serial photo mode. Therefore, with highly-skilled photographers taking photographs in serial photo mode, there is a high probability that VR lens 60 will reach the outer limit of its range of movement if VR lens 60 is not centered at some time during the series of photographers.

Figure 4:
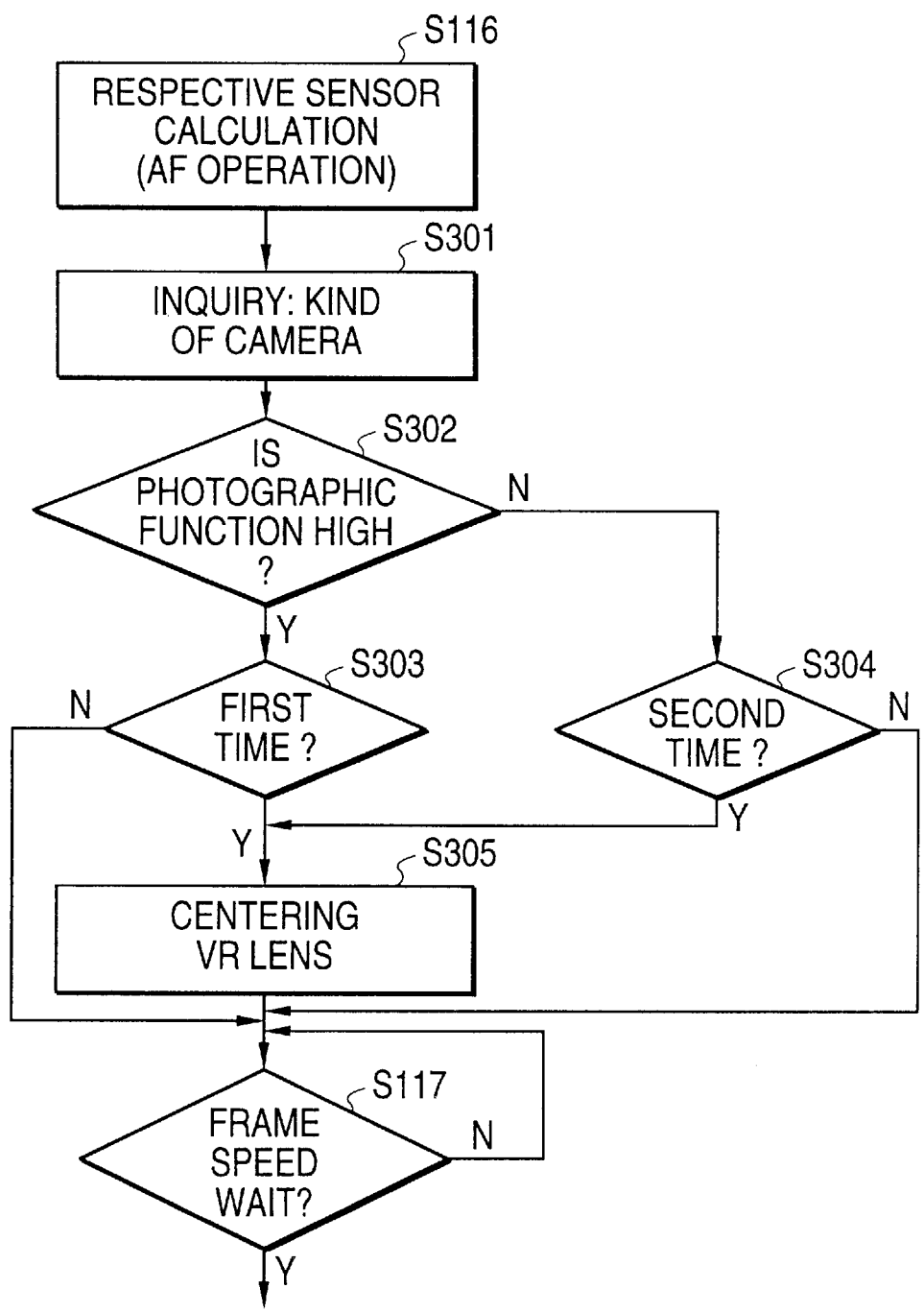
FIG. 4 is a flow chart illustrating a processing sequence of a camera as illustrated in FIG. 1, according to a further embodiment of the present invention.

To address these problems, FIG. 4 is a flow chart illustrating a processing sequence of a camera as illustrated in FIG. 1, according to a further embodiment of the present invention. FIG. 4 illustrates a modification of the processing sequence illustrated in FIG. 2, and illustrates additional steps to be performed between Steps S116 and S117 of FIG. 2. More specifically, FIG. 4 illustrates a processing sequence in which, during serial photo mode, VR lens 60 is only centered for a subsequent photograph if the drive time for driving VR lens 60 in the previous photograph is longer than a predetermined elapsed time. Moreover, a longer elapsed time is used for high skilled photographers than for novice photographers.

The elapsed time for use with highly skilled photographers and the elapsed time for use with novice photographers is preferably set at the time of manufacture and stored in memory unit 19. Alternatively, these elapsed times can be set by the photographer via elapsed time setting unit 17.

In a camera which follows the processing sequence of FIG. 4, drive circuit control unit 12, which controls motion compensation, is preferably positioned inside lens 2. Lens 2 is mounted on camera body 1, and components within lens 2 can communicate with components within camera body 1 when motion compensation is being performed. The camera body can be one of two types. For example, the camera body can be a type of camera body for use by highly skilled photographer, thereby including functions typically used by highly skilled photographers. Instead, the camera body can be a type of camera body for use by novice photographers, thereby including functions typically used by novice photographers. Memory unit 19 (see FIG. 3) stores data indicating whether the camera is for use by highly skilled photographers or novice photographers. Therefore, at the time of manufacture, the camera can be designed to be for use by highly skilled photographers or for novice photographers, with corresponding data stored in memory unit 19. Alternatively, the camera could including a switch to indicate whether the camera is set to function for highly skilled photographers or for novice photographers.

Referring now to FIG. 4, from step S116 the process moves to step S301. However, before the process reaches step S301, VR lens 60 was initially centered in step S104 (see FIG. 2), an exposure operation was initiated in step S108 (see FIG. 2), the exposure operation was ended in step S109 (see FIG. 2), and the camera is in serial photo mode in step S114 (see FIG. 2). Then, in step S301, the elapsed time determining unit 16 inquires from memory unit 19 whether the camera is for use by highly skilled photographers or novice photographers. From step S301, there process moves to step S302. When the camera is for highly skilled photographers (that is, the photographic function is "high") in step S302, the process moves to step S303. When the camera is for novice photographers (that is, the photographer function is not "high") in step S302, the process moves to step S304. In step S303, it is determined whether or not the drive time for driving VR lens 60 in the last taken photograph is longer than the first elapsed time. Therefore, it is determined whether the time to drive VR lens 60 from step S107 (see FIG. 2) to step S110 (see FIG. 2) for the last taken photograph is greater than or equal to the first elapsed time. If the time to drive VR lens 60 is greater than or equal to the first elapsed time in step S303, the process moves to step S305 where VR lens 60 is centered. From step S305, the process moves to step S117. If the time to drive VR lens 60 is not greater than or equal to the first elapsed time in step S303, the process moves to step S117, thereby skipping step S305 so that VR lens 60 is not centered.

By contrast, in step S304, it is determined whether or not the drive time for driving VR lens 60 in the last taken photograph is longer than the second elapsed time. If the time to drive VR lens 60 is greater than or equal to the second elapsed time in step S304, the process moves to step S305, where VR lens 60 is centered. If the time to drive VR lens 60 is not greater than or equal to the second elapsed time in step S304, the process moves to step S117, thereby skipping step S305 so that VR lens 60 is not centered. The first elapsed time (that is, the elapsed time for highly skilled photographers) is longer than the second elapsed time (that is, the elapsed time for novice photographers).

Therefore, as illustrated in FIG. 4, during serial photo mode, VR lens 60 is centered before a first photograph is taken, and centered again whenever a predetermined elapsed time elapses from a specific event. However, the predetermined elapsed time is different when the camera is configured for highly skilled photographers, as compared to when the camera is configured for novice photographers.

According to the embodiment of the present invention as described above for FIG. 4, the elapsed time corresponds to the drive time for driving VR lens 60 in the previous photograph. However, as also described for the embodiments of the present invention illustrated in FIG. 3, the elapsed time can easily correspond to other time measurements. For example, in an additional embodiment of the present invention, the elapsed time can correspond to the time from the previous centering operation. Alternatively, the elapsed time could correspond to the total amount of drive time of VR lens 60 since the previous centering operation. Therefore, for example, VR lens 60 would only be centered in step S305 (see FIG. 4) after the total drive time is greater than or equal to the set elapsed time.

As previously described, a camera can include many functions, some of which are for use by highly skilled photographers, and some of which are for use by novice photographers. Thus, the same camera may be used by highly skilled photographers or novice photographers. Thus, the camera can simply include a switch which is set by the photographer to indicate whether the camera is being used by a highly skilled photographer or a novice photographer. In this case, step S302 of FIG. 4 would determine whether the switch is set to indicate use by a highly skilled photographer or a novice photographer, where "the photographic function being high" in step S302 corresponds to use by a highly skilled photographer, and "the photographic function not being high" in step S302 corresponds to the use by a novice photographer.

According to embodiments of the present invention as illustrated in FIG. 4, VR lens 60 will be centered after a predetermined period (that is, the set elapsed time) of time elapses from a specific event. An appropriate predetermined time can easily determined to prevent VR lens 60 from extending beyond its outer range of motion, even when a photographer takes a relatively large number of photographs during serial photo mode. Moreover, in the embodiments of the present invention as illustrated in FIG. 4, the predetermined period of time is set longer for highly skilled photographers as opposed to novice photographers. Therefore, the number of times VR lens 60 is centered can be greatly reduced when the camera is used by a highly skilled photographer. As a result, the frame speed during serial photo mode can be increased, and the power consumption of the camera can be reduced.

Figure 5:
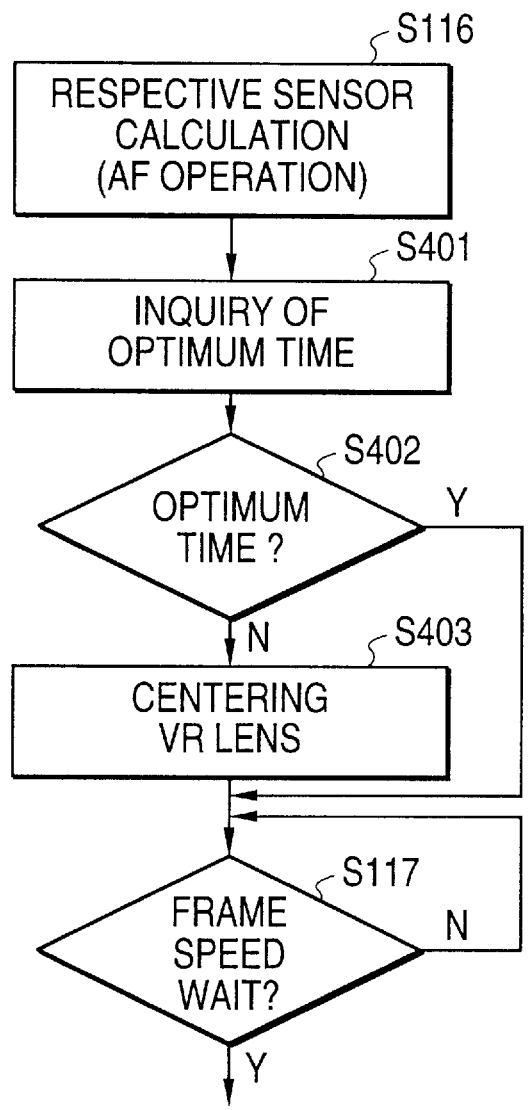
FIG. 5 is a flow chart illustrating a processing sequence of a camera as illustrated in FIG. 1, according to an embodiment of the present invention.

FIG. 5 is a flow chart illustrating a processing sequence of a camera as illustrated in FIG. 1, according to an additional embodiment of the present invention. FIG. 5 illustrates a modification of the processing sequence illustrated in FIG. 2, and illustrates additional steps to be performed between Steps S116 and S117 of FIG. 2, according to an additional embodiment of the present invention.

More specifically, FIG. 5 illustrates a processing sequence which determines an optimum time indicating an approximate drive time for driving VR lens 60 that will cause VR lens 60 to reach the outer limit of its range of motion from the initial, centered position. Each time VR lens 60 actually reaches the outer limit of its range of motion after starting at the centered position, the drive time required to reach the outer limit is stored and averaged into the optimum time. In other words, the drive time during each photograph is accumulated and totaled until VR lens 60 reaches the outer limit of its range of motion. When VR lens 60 reaches the outer limit, the drive time to reach the outer limit is averaged into the optimum time, to update the optimum time. In this manner, when in serial photo mode, the optimum time is continually updated to reflect differences between photographers. The drive time for each photograph corresponds to the time at which VR lens 60 is driven from step S107 (see FIG. 2) to step S110 (see FIG. 2). Therefore, the drive time for each photograph taken during serial photo mode is totaled and stored in memory unit 19 for averaging with the optimum time. The optimum time is stored in memory unit 19.

Referring now to FIG. 5, from step S116 the process moves to step S401. However, before the process reaches step S401, VR lens 60 was initially centered in step S104 (see FIG. 2), motion compensation was started in step S107 (see FIG. 2), an exposure operation was initiated in step S108 (see FIG. 2) and ended in step S109 (see FIG. 2), motion compensation was ended in step S110 (see FIG. 2), and the camera was in serial photo mode in step S114 (see FIG. 2).

From step S116, the process moves to step S401. In step S401, elapsed time determination unit 16 reads the optimum time from memory unit 19. Before the first photograph is taken, an initial optimum time is stored in memory unit 19. This initial optimum time can be calculated based on the relationship between movement of VR lens 60 and the drive time of VR lens 60. As previously described, this optimum time is updated when VR lens 60 reaches the outer limit of its range of motion.

From step S401, the process moves to step S402, where it is determined whether or not the elapsed time for driving VR lens 60 from the center position is within the optimum time. If the elapsed time is not within the optimum time in step S402 (that is, the elapsed time exceeds the optimum time), the process moves to step S403 where VR lens 60 is centered. From step S403, the process moves to step S117. If the elapsed time is within the optimum time in step S402 (that is, the elapsed time does not exceed the optimum time), the process moves to step S117, thereby skipping step S403 so that VR lens 60 is not centered.

According to the embodiments of the present invention as illustrated in FIG. 5, the optimum elapsed time can be updated according to the habits of each photographer and the camera functions being used. Therefore, VR lens 60 will not reach the outer limit of its range of motion, even when a large number of photographs are taken in serial photo mode.

In the above embodiments of the present invention, various computations and determination are made by referring to the position of VR lens 60. Such position is determined by VR lens movement detection unit 15.

According to the above embodiments of the present invention, position determining operation setting unit 18 can set whether or not centering of VR lens 60 is to be performed. Therefore, the film frame speed can be increased or the accuracy of motion compensation can be increased, by appropriately setting position determining operation setting unit 18. Thus, position determining operation setting unit 18 can be set so that centering of VR lens 60 is performed only when necessary.

According to the embodiments of the present invention as illustrated in FIG. 5, an optimum time for driving VR lens 60 is determined in accordance with the performance of the camera (for example, whether the camera is set for a highly skilled photographer or a novice photographer) and in accordance with the unique characteristics of each photographer (for example, some photographers may produce more hand tremor vibration than other photographers). Therefore, the embodiments of the present invention can increase the film frame speed and reduce power consumption by reducing the number of times VR lens 60 is centered.

In addition, the embodiments of the present invention allow each photographer to have a corresponding optimum time, so that different photographers can use the same camera while maintaining different optimum times.

Figure 6:
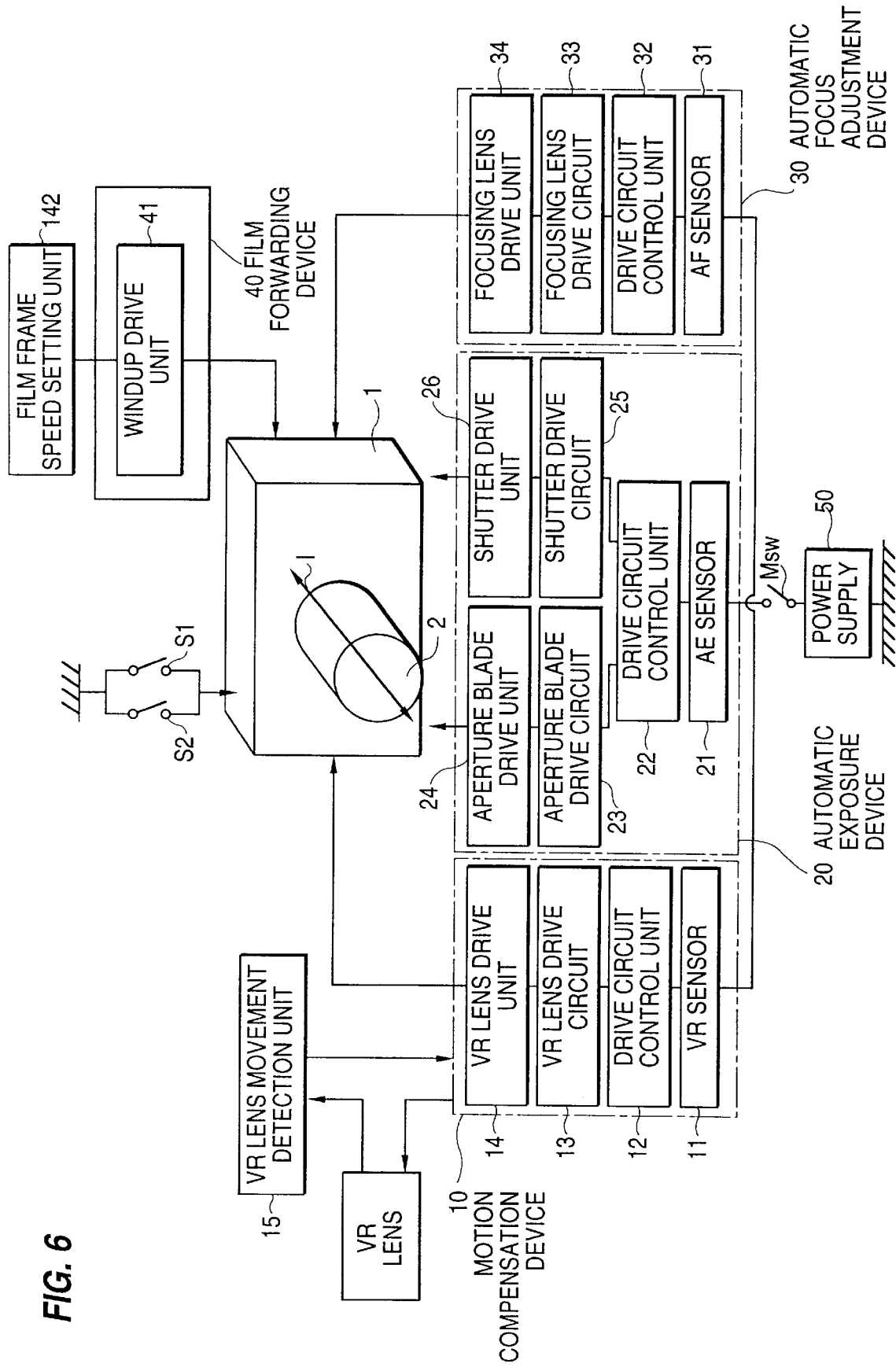
FIG. 6 is a block diagram illustrating a camera having a motion compensation device, according to an embodiment of the present invention.

FIG. 6 is a block diagram illustrating a camera having a motion compensation device, according to an embodiment of the present invention. Various elements illustrated in FIG. 6 are also illustrated in FIG. 1. Therefore, a repeat description will not be presented here.

In FIG. 6, a frame speed setting unit 142 sets the speed (that is, the frame speed) at which windup drive unit 41 winds the film (not illustrated) from the end of a previous exposure to the start of the next exposure. Therefore, frame speed setting unit 142 is for setting the frame interval time from the end of a previous exposure to the start of the next exposure when the camera is in serial photo mode. Windup drive unit 41 winds the film while regulating the speed of the windup motor (not illustrated). Windup drive unit 41 varies the reduction ratio or the drive voltage, to attain the frame speed set by frame speed setting unit 142. Moreover, windup drive unit 41 can also regulate the frame speed by providing a predetermined waiting time for the windup motor.

Figure 7:
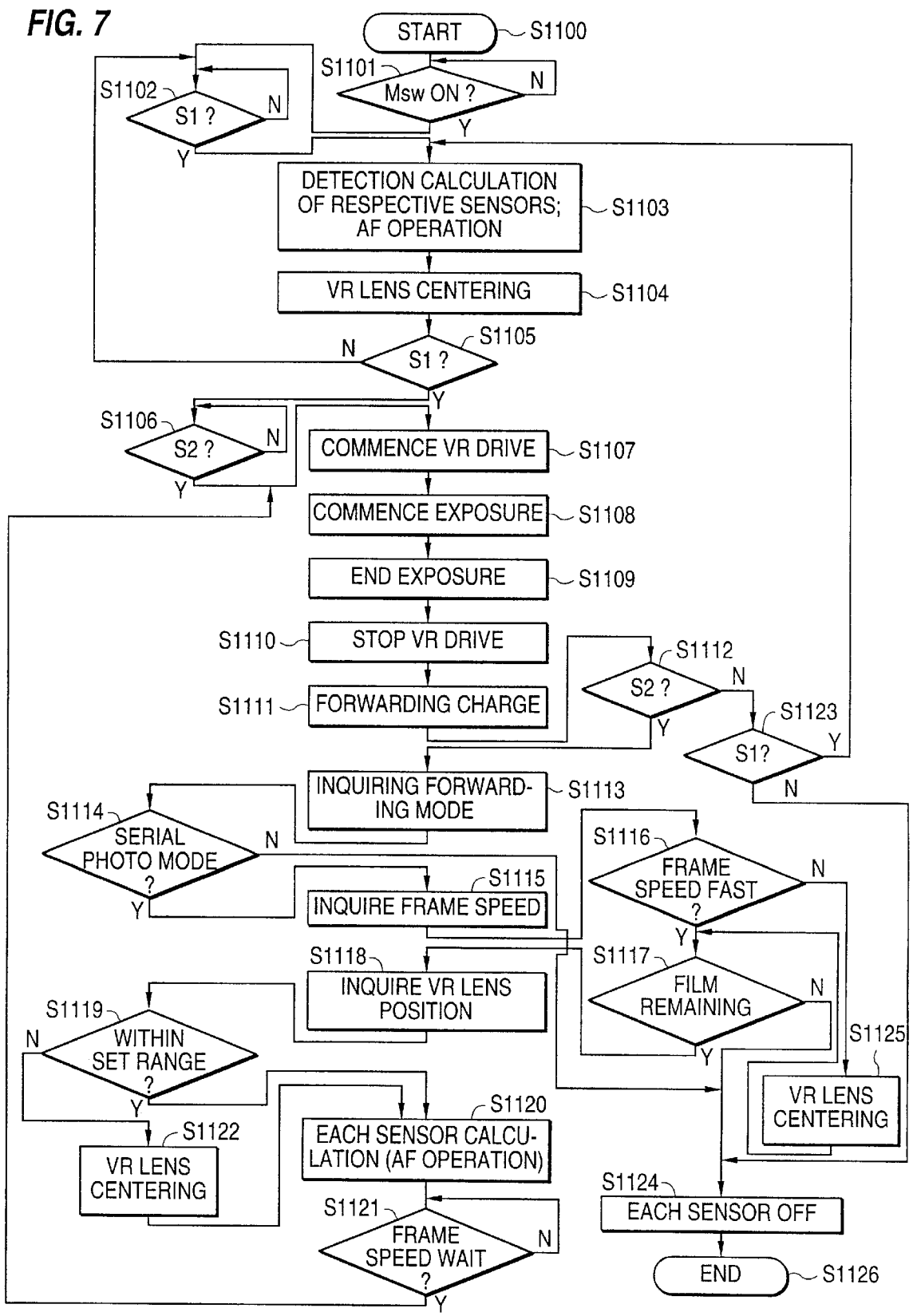
FIG. 7 is a flow chart illustrating a processing sequence of a camera as illustrated in FIG. 2, according to an embodiment of the present invention.

FIG. 7 is a flow chart illustrating a processing sequence of a camera as illustrated in FIG. 6, according to an embodiment of the present invention. According to the embodiments of the present invention as illustrated in FIG. 7, a centering operation of VR lens 60 is performed in accordance with the film frame speed and the position of VR lens 60, to thereby eliminate unnecessary centering when the film frame speed is relatively fast.

The processing sequence in FIG. 7 is performed by a CPU (preferably a single CPU) which functions as drive circuit control unit 12, drive circuit control unit 22 and drive circuit control unit 32.

Referring now to FIG. 7, the process starts in step S1100. From step S1100, the process moves to step S1101 where that status of main switch MSW is checked. If main switch MSW if OFF in step S1101, the process waits at step S1101 until main switch MSW is turned ON. If main switch MSW is ON in step S1101, the process moves to step S1102. In step S1102, the process waits until switch SW1 turns ON, thereby indicating that the release button is pushed to the half-push position. When switch SW1 is ON in step S1102, the process moves to step S1103, where power is supplied to VR sensor 11, AE sensor 21, AF sensor 31 and corresponding calculations are performed. More specifically, in step S1103, drive circuit control unit 22 determines appropriate values for the shutter speed and aperture value, and drive circuit control unit 32 controls autofocus (AF) drive of focusing lens drive unit 34.

From step S1103, the process moves to step S1104, where drive circuit control unit 12 centers VR lens 60 towards a predetermined initial position at which the optical axis of VR lens 60 coincides with the center of the optical axis of the overall photographic lens system used in lens 2.

From step S1104, the process moves to step S1105, where the status of switch SW1 is checked. When switch SW1 is OFF in step S1105, the process moves to step S1102 and waits for SW1 to be switched ON again. That is, switch SW1 must have been switched ON for the process to have reached step S1105; however, if switch SW1 is OFF at the time the process reaches step S1105 (indicating that the release button is no longer pushed to the half-push position), the process moves to step S1102 and waits for switch SW1 to be turned ON (that is, for the release button to be pushed to the half-push position). When switch SW1 is ON in step S1105, the process moves to step S1106 and waits for switch SW2 to be turned ON. When switch SW2 is OFF in step S1106 (thereby indicating that the release button is not pushed to the full-push position), the process waits at step S1106 for switch SW2 to be turned ON. When switch SW2 is ON in step S1106 (thereby indicating that the release button is pushed to the full-push position), the process moves to step S1107.

In step S1107, drive circuit control unit 12 drives VR lens 60 based on the output of VR sensor 11. From step S1107, the process moves to step S1108, where drive circuit control unit 22 starts an exposure operation to exposure a recording medium (not illustrated), such as, for example, film or an optical disk. From step S1108, the process moves to step S1109, where the exposure operation is ended after a predetermined time period, corresponding to the exposure time, has elapsed. From step S1109, the process moves to step S1110, where drive circuit control unit 12 stops the drive of VR lens 60. From step S1110, the process moves to step S1111, where the film is forwarded one frame. Moreover, other process can be performed in step S1111 to prepare for the next photograph. Such other processes can include, for example, charging the shutter and raising a mirror (in a single-lens-reflex camera).

From step S1111, the process moves to step S1112, where the status of switch SW2 is checked (to thereby check whether the release button is pushed to the full-push position). If switch SW2 is ON in step S1112 (thereby indicating that the release button is still pushed to the full-push position), the process moves to step 1113, where an inquiry is made as to the film forwarding mode. From step S1113, the process moves to step S1114. When the film forwarding mode is not set for serial photo mode in step S1114, the process moves to step S1124 where the power supplied to VR sensor 11, AE sensor 21 and AF sensor 31 is stopped. From step S1124, the process moves to step S1126 and ends.

When the film forwarding mode is set for serial photo mode in step S1114, the process moves to step S1115, where an inquiry is made as to the film frame speed. The film frame speed is the speed of winding from the end of one exposure to the beginning of the next exposure. The film frame speed is set by the film frame speed setting unit 142. Preferably, the film frame speed has a "fast" setting and a "slow" setting. However, at the option of the photographer, a camera can have a film frame speed which is set to be continuously adjusted according to the operations of the photographer.

From step S1115, the process moves to step S1116 where it is determined whether the film frame speed is "fast" or "slow". For example, if the film frame speed was set to be "fast", then the film frame speed is "fast" in step S1116. Similarly, if the film frame speed was set to be "slow", then the film frame speed is "slow" in step S1116. Moreover, if the film frame speed is set to be continuously adjusted, then the film frame speed can be considered to be "fast" if it is below a predetermined threshold value, and can be considered to be "slow" if it is greater than or equal to the predetermined threshold value.

In general, the film frame speed is determined to be "fast" if it is shorter than a threshold time, and is determined to be "slow" if it is determined to be equal to or longer than the threshold time. However, additional embodiments can easily be provided which set the film frame speed in different manners. For example, the film frame speed can be considered to be "fast" in step S1116 if the shutter speed in seconds is less than the time from the end of one exposure to the start of the next exposure. Similarly, the film frame speed can be considered to be "slow" in step S1116 if the shutter speed in seconds is greater than or equal to the time from the end of one exposure to the start of the next exposure. Whether the film frame speed is "fast" or "slow" in step S1116 can also be determined by multiplying the shutter speed by a predetermined value greater than one, and comparing the resulting value to the time from the end of one exposure to the start of the next exposure. For example, when the shutter speed multiplied by the predetermined value is less than the time from the end of one exposure to the start of the next exposure, the film frame speed can be considered to be "fast" in step S1116. Similarly, when the shutter speed multiplied by the predetermined value is greater than or equal to the time from the end of one exposure to the start of the next exposure, the film frame speed can be considered to be "slow" in step S1116.

When the film frame speed is "fast" in step S1116, the process moves to step S1117 where it is determined whether or not there is one or more frames of film remaining. If there is not one or more frames of film remaining in step S1117, the process moves to step S1124 where the power supplied to VR sensor 11, AE sensor 21 and AF sensor 31 is stopped. If there is one or more frames of film remaining in step S1117, the process moves to step S1118 where the position of VR lens 60 is checked. From step S1118, the process moves to step S1119, where it is determined whether the position of VR lens 60 is within a predetermined range.

Various values of the predetermined range can used in step S1119. For example, the predetermined range can be set so that it is determined in step S1119 whether VR lens 60 is within a predetermined range from the centering position. Alternatively, the predetermined range can be set in accordance with the probability of VR lens 60 reaching the outer range of its movement. For example, hand tremors of a photographer are considered to be arbitrarily occurring vibrations. Therefore, the ending position of VR lens 60 after each photograph can significantly differ for each photograph and for different photographers. However, serial photography generally results in reduced image blur for the sequential photographs in the series. Moreover, the subject luminosity is relatively stable in serial photography. As a result, the exposure time is relatively stable in serial photography. Therefore, the probability of VR lens 60 reaching the outer limit of its range of motion is low when the predetermined range in step S1119 is set, for example, to be substantially one-half (½) the distance of the range of movement of VR lens 60 from the optical axis.

If VR lens 60 is within the predetermined range in step S1119, the process moves to step S1120 where the shutter speed and aperture value are calculated based on new results from AE sensor 21 and AF sensor 31, and, if necessary, focusing is performed. From step S1120, the process moves to step S1121, where the process waits for the film frame speed to elapse. After the film frame speed elapses, the process moves from step S1121 to step S1170 where VR drive commences.

If VR lens 60 is not within the predetermined range in step S1119, the process moves to step S1122, where VR lens 60 is centered. From step S1122, the process moves to step S1120.

If switch SW2 is OFF in step S1112 (thereby indicating that the release button is not pushed to the full-push position), the process moves to step S1123, where the status of switch SW1 is checked. If switch SW1 is ON in step S1123 (thereby indicating that the release button is pushed to the half-push position), the process moves to step S1103. If switch SW1 is OFF in step S1123, the process moves to step S1124, where the power supplied to VR sensor 11, AE sensor 21 and AF sensor 31 is stopped.

When the film frame speed is "slow" in step S1116, the process moves to step S1125, where VR lens 60 is centered. From step S1125, the process moves to step S1117.

According to the embodiments of the present invention as illustrated in FIG. 7, VR lens 60 is not centered between sequential photographs taken during serial photo mode when (a) the film frame speed is fast and (b) VR lens 60 is within a predetermined range from the optical axis at the end of the exposure of the previous photograph. Therefore, VR drive of a respective photograph can commence from the position of VR lens 60 at the end of exposure of the previous photograph, without centering VR lens 60. As a result, unnecessary time for centering VR lens 60 is not incurred, the drive speed during serial photo mode will not fall, photographic opportunities will be increased, and the camera will be relatively easy to use.

According to embodiments of the present invention as illustrated in FIG. 7, the centering of VR lens 60 can be prevented when the film frame speed is "fast", or shorter than a predetermined time. As a result, the film frame speed will not be reduced by time required to center VR lens 60.

According to embodiments of the present invention as illustrated in FIG. 7, centering of VR lens 60 is performed when the film frame speed is longer than a predetermined time (for example, when the film frame speed is not "fast" in step S1116 in FIG. 7). Therefore, centering can be performed within the time required while still achieving the film frame speed. As a result, the film frame speed will not be decreased.

According to the above embodiments of the present invention, the a lens is moved to an initial position before photographs are taken. The initial position is described herein as being a "centering" position. However, the initial position is not intended to be limited a "center" position. Instead, the initial position can be virtually any position for use as a starting position from which a VR lens is driven.

The present invention is described as relating to a camera. However, the present invention is not intended to be limited to a camera. For example, the present invention can be used in devices including, but not limited to, camcorders, motion picture cameras, telescopes, binoculars, microscopes, range finding equipment, lasers, fiber optic communication systems, various optical projection systems and CD mastering systems.

The present invention is described as relating to a camera which uses film as a recording medium. However, the recording medium is not intended to be limited to "film". Virtually any type of recording medium can be used, such as, for example, an optical disk, a magneto-optical disk, a charged-coupled device (CCD). Moreover, if the present invention is applied to, for example, binoculars, the recording medium can be the eye of a person.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera which is settable to be in a serial photo mode for taking a series of continuous photographs, and in a non-serial photo mode for taking non-continuous, individual photographs, the camera comprising:
   - a lens which is shiftable during each photograph to suppress image blur, the lens having an initial position, and the position of the lens after a respective photograph is taken being defined as a final lens position for the respective photograph; and
   - a control mechanism which,
     when the camera is set in the non-serial photo mode, suppresses image blur by, for each individual photograph to be taken, positioning the lens at the initial position before the photograph is taken and shifting the lens from the initial position, and,
     when the camera is set in the serial photo mode, suppresses image blur by, for respective photographs taken subsequent to a first photograph of a series of continuous photographs, shifting the lens from the final lens position of the previous photograph, without repositioning the lens at the initial position.

2. A camera as in claim 1, further comprising:
   a setting unit which is settable to cause the control mechanism, when the camera is set in the non-serial photo mode, to suppress image blur by, for each individual photograph taken after a first photograph, shifting the lens from the final lens position of the previous photograph, without positioning the lens at the initial position.

3. A camera as in claim 1, wherein, when the camera is set in the serial photo mode, the control mechanism positions the lens in the initial position before a first photograph of a series of continuous photographs is taken.

4. A camera as in claim 1, wherein, when the camera is set in the serial photo mode, the control mechanism positions the lens in the initial position after a last photograph of a series of continuous photographs is taken.

5. A camera as in claim 1, wherein,
   for each photograph taken, the lens drive time is defined as the time during which the lens was shifted to suppress image blur for the photograph, and
   for photographs taken subsequent to a first photograph of a series of continuous photographs when the camera is set in the serial photo mode, the control mechanism positions the lens at the initial position before a respective photograph is taken and shifts the lens from the initial position, when the drive time for the previous photograph is greater than or equal to a maximum time.

6. A camera as in claim 5, further comprising a time setting unit for setting the maximum time.

7. A camera as in claim 3, wherein,
   for each photograph taken, the lens drive time is defined as the time during which the lens was shifted to suppress image blur for the photograph, and
   for photographs taken subsequent to a first photograph of a series of continuous photographs when the camera is set in the serial photo mode, the control mechanism positions the lens at the initial position before a respective photograph is taken and shifts the lens from the initial position, when the total of the drive times for previous photographs taken since the lens was last positioned at the initial position is greater than or equal to a maximum time.

8. A camera as in claim 3, wherein, for photographs taken subsequent to a first photograph of a series of continuous photographs when the camera is set in the serial photo mode, the control mechanism positions the lens at the initial position before a respective photograph is taken and shifts the lens from the initial position, when the time since the lens was last positioned at the initial position is greater than or equal to a maximum time.

9. A camera as in claim 5, wherein the camera is settable to a first performance level and a second performance level, and the maximum time is different when the camera is set for the first performance level as compared to the maximum time when the camera is set for the second performance level.

10. A camera as in claim 7, wherein the camera is settable to a first performance level and a second performance level, and the maximum time is different when the camera is set for the first performance level as compared to the maximum time when the camera is set for the second performance level.

11. A camera as in claim 8, wherein the camera is settable to a first performance level and a second performance level, and the maximum time is different when the camera is set for the first performance level as compared to the maximum time when the camera is set for the second performance level.

12. A camera as in claim 5, wherein the lens is shiftable within a range of motion having an outer limit, and each time the lens reaches the outer limit of the range of motion, the control mechanism determines the total lens drive time required for the lens to move to the outer limit and updates the maximum time in accordance with the total lens drive time.

13. A camera as in claim 12, wherein, each time the lens reaches the outer limit of the range of motion, the control mechanism updates the maximum time by averaging the total lens drive into the maximum time.

14. A camera as in claim 1, wherein, for photographs taken subsequent to a first photograph of a series of continuous photographs when the camera is set in the serial photo mode, the control mechanism shifts the lens from the final lens position of the previous photograph, without repositioning the lens at the initial position, when the film frame speed of the camera is less than a threshold value, and positions the lens at the initial position before a respective photograph is taken and shifts the lens from the initial position, when the film frame speed of the camera is greater than or equal to the threshold value.

15. A camera as in claim 1, wherein, for photographs taken subsequent to a first photograph of a series of continuous photographs when the camera is set in the serial photo mode, the control mechanism positions the lens at the initial position before a respective photograph is taken and shifts the lens from the initial position, when the film frame speed of the camera is greater than or equal to a threshold value.

16. A camera as in claim 14, wherein, for photographs taken subsequent to a first photograph of a series of continuous photographs when the camera is set in the serial photo mode and the film frame speed is less than the threshold value, the control mechanism positions the lens at the initial position before a respective photograph is taken and shifts the lens from the initial position, when the final lens position of the previous photograph is beyond a specific range from the initial position.

17. A camera as in claim 16, wherein the lens has a range of movement from the optical axis of the camera, and the specific range is approximately equal to one-half the range of movement of the lens.

18. A camera which is settable to be in a serial photo mode for taking a series of continuous photographs, and in a non-serial photo mode for taking individual photographs, the camera comprising:

a lens which is shiftable during each photograph to suppress image blur, the lens having an initial position, and the position of the lens after a respective photograph is taken being defined as a final lens position for the respective photograph, and, for each photograph taken, a lens drive time is defined as the time during which the lens is shifted to suppress image blur for the photograph; and a control mechanism which, when the camera is set in the non-serial photo mode, suppresses image blur by, for each individual photograph to be taken, positioning the lens at the initial position before the photograph is taken and shifting the lens from the initial position, and, when the camera is set in the serial photo mode, suppresses image blur by, for respective photographs taken subsequent to a first photograph of a series of continuous photographs, shifting the lens from the final lens position of the previous photograph, without repositioning the lens at the initial position, when the total of the drive times for previous photographs taken since the lens was last positioned at the initial position is less than a maximum time, and positioning the lens at the initial position before a respective photograph is taken and shifting the lens from the initial position, when the total of the drive times for previous photographs taken since the lens was last positioned at the initial position is greater than or equal to the maximum time.

19. A camera which is settable to be in a serial photo mode for taking a series of continuous photographs, and in a non-serial photo mode for taking individual photographs, the camera comprising:

a lens which is shiftable during each photograph to suppress image blur, the lens having an initial position, and the position of the lens after a respective photograph is taken being defined as a final lens position for the respective photograph; and a control mechanism which, when the camera is set in the non-serial photo mode, suppresses image blur by, for each individual photograph to be taken, positioning the lens at the initial position before the photograph is taken and shifting the lens from the initial position, and, when the camera is set in the serial photo mode, suppresses image blur by, for respective photographs taken subsequent to a first photograph of a series of continuous photographs, shifting the lens from the final lens position of the previous photograph, without repositioning the lens at the initial position, when the film frame speed of the camera is less than a threshold value, and positioning the lens at the initial position before a respective photograph is taken and shifting the lens from the initial position, when the film frame speed of the camera is greater than or equal to the threshold value.

20. A camera which is settable to be in a serial photo mode for taking a series of continuous photographs, and in a non-serial photo mode for taking non-continuous, individual photographs, the camera comprising:

a lens which is shiftable during each photograph to suppress image blur, the lens having an initial position; and a control mechanism which, when the camera is set in the non-serial photo mode, suppresses image blur by, for each individual photograph to be taken, positioning the lens at the initial position before the photograph is taken and shifting the lens from the initial position, and, when the camera is set in the serial photo mode, suppresses image blur by, for photographs taken in a series of continuous photographs, shifting the lens without repositioning the lens at the initial position.

21. A camera as in claim 20, wherein, when the camera is set in the serial photo mode, the control mechanism positions the lens in the initial position before a first photograph of a series of continuous photographs is taken.

22. A camera as in claim 20, wherein, for each photograph taken, a lens drive time is defined as the time during which the lens was shifted to suppress image blur for the photograph, and for photographs taken subsequent to a first photograph of a series of continuous photographs when the camera is set in the serial photo mode, the control mechanism positions the lens at the initial position before a respective photograph is taken and shifts the lens from the initial position, when the lens drive time for the previous photograph is greater than or equal to a maximum time.

23. A camera as in claim 20, wherein the camera has a film frame speed and, for photographs taken subsequent to a first photograph of a series of continuous photographs when the camera is set in the serial photo mode, the control mechanism positions the lens at the initial position before a respective photograph is taken and shifts the lens from the initial position, when the film frame speed is greater than or equal to a threshold value.

24. A camera which is settable to be in a serial photo mode for taking a series of continuous photographs, and in a non-serial photo mode for taking non-continuous, individual photographs, the camera comprising:

a lens which is shiftable during each photograph to suppress image blur, the lens having an initial position; and a control mechanism which, when the camera is set in the non-serial photo mode, suppresses image blur by, for each individual photograph to be taken, positioning the lens at the initial position before the photograph is taken and shifting the lens from the initial position, and, when the camera is set in the serial photo mode, suppresses image blur by positioning the lens at the initial position before a first photograph of a series of continuous photographs and, for respective photographs of the series of continuous photographs taken subsequent to the first photograph, shifting the lens without repositioning the lens at the initial position.

25. A camera as in claim 24, wherein, for each photograph taken, a lens drive time is defined as the time during which the lens was shifted to suppress image blur for the photograph, and for photographs taken subsequent to a first photograph of a series of continuous photographs when the camera is set in the serial photo mode, the control mechanism positions the lens at the initial position before a respective photograph is taken and shifts the lens from the initial position, when the total of the lens drive times for previous photographs taken since the lens was last positioned at the initial position is greater than or equal to a maximum time.

26. A camera which takes a series of continuous photographs, comprising:

a lens which is shiftable during each photograph to suppress image blur, the lens having an initial position, and the position of the lens after a respective photograph is taken being defined as a final lens position for the respective photograph; and a control mechanism which suppresses image blur by, for respective photographs taken subsequent to a first photograph of a series of continuous photographs, shifting the lens from the final lens position of the previous photograph, without repositioning the lens at the initial position.

* * * * *